United States Patent
Ono (10) Patent No.: US 7,039,419 B2
(45) Date of Patent: May 2, 2006

(54) CELL PHONE POSITION MEASUREMENT SYSTEM, POSITION MEASUREMENT METHOD, AND CELL PHONE TERMINAL

(75) Inventor: Hiroshi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 494 days.

(21) Appl. No.: 10/237,817

(22) Filed: Sep. 9, 2002

(65) Prior Publication Data

US 2003/0054839 A1 Mar. 20, 2003

(30) Foreign Application Priority Data

Sep. 14, 2001 (JP) .............................. 2001-279471

(51) Int. Cl.
*H04Q 7/20* (2006.01)
(52) U.S. Cl. ................ 455/456.1; 455/342; 455/456.3; 455/463; 455/550.1; 455/517; 455/575.7; 455/552.1; 370/337; 701/209
(58) Field of Classification Search ............. 455/456.3, 455/456, 463, 550.1, 334, 517, 575.7, 552.1, 455/342; 370/337; 701/209
See application file for complete search history.

(56) References Cited

U.S. PATENT DOCUMENTS

| | | | | |
|---|---|---|---|---|
| 5,752,204 A | * | 5/1998 | Epperson et al. ........ | 455/575.7 |
| 5,910,949 A | * | 6/1999 | Bilstrom et al. ............ | 370/337 |
| 6,049,708 A | * | 4/2000 | Tsujita ......................... | 455/334 |
| 6,195,597 B1 | * | 2/2001 | Yamada .................... | 455/550.1 |
| 6,298,243 B1 | * | 10/2001 | Basile ....................... | 455/552.1 |
| 6,501,956 B1 | * | 12/2002 | Weeren et al. .............. | 455/463 |
| 6,522,888 B1 | * | 2/2003 | Garceran et al. ......... | 455/456.3 |
| 6,560,532 B1 | * | 5/2003 | Cayford ...................... | 701/209 |
| 6,801,782 B1 | * | 10/2004 | McCrady et al. ........... | 455/517 |
| 2002/0107032 A1 | * | 8/2002 | Agness et al. .............. | 455/456 |

FOREIGN PATENT DOCUMENTS

| EP | 1 054 265 A2 | 11/2000 |
|---|---|---|
| EP | 001054265 A2 * | 11/2000 |

* cited by examiner

*Primary Examiner*—William Trost
*Assistant Examiner*—Chuck Huynh
(74) *Attorney, Agent, or Firm*—Scully, Scott, Murphy & Presser, P.C.

(57) ABSTRACT

In a cell phone position measurement system, a position measurement unit performs position measurement using a (GPS) satellite. A cell phone terminal notifies the position measurement unit of a (GPS) signal received from the satellite and receives a position information service. In the cell phone terminal, a receiving unit receives the signal from the satellite. A radio phone unit notifies the position measurement unit via a radio channel and a cell phone network of position measurement data obtained from the signal received by the receiving unit. A controller controls the radio phone unit and temporarily interrupts communication via the radio channel in position measurement through the receiving unit. A position measurement method is also disclosed.

3 Claims, 12 Drawing Sheets

CELL PHONE POSITION MEASUREMENT SYSTEM, POSITION MEASUREMENT METHOD, AND CELL PHONE TERMINAL

BACKGROUND OF THE INVENTION

The present invention relates to a cell phone position measurement system and control method for measuring the position of a cell phone terminal by using the position measurement system.

Along with the spread of cell phone systems, more advanced services are being provided to cell phone terminals. One of the services is position information service which provides information corresponding to the position of a cell phone terminal by using a position measurement system from the cell phone terminal. Current position measurement methods are position measurement by GPS (Global Positioning System), position measurement based on the cell number of a cell phone system, and position measurement by the arrival time of the reception/transmission signal of the cell phone system.

GPS position measurement includes a single measurement method of measuring a position by a single terminal, a server-assist method of transmitting a message from a GPS satellite from a server connected to a network to a terminal and calculating a position by the terminal, and a server-driven method of transmitting, to a server on a network, a signal from a GPS satellite that has been received by a terminal and calculating the terminal position by the server.

Figure 10:
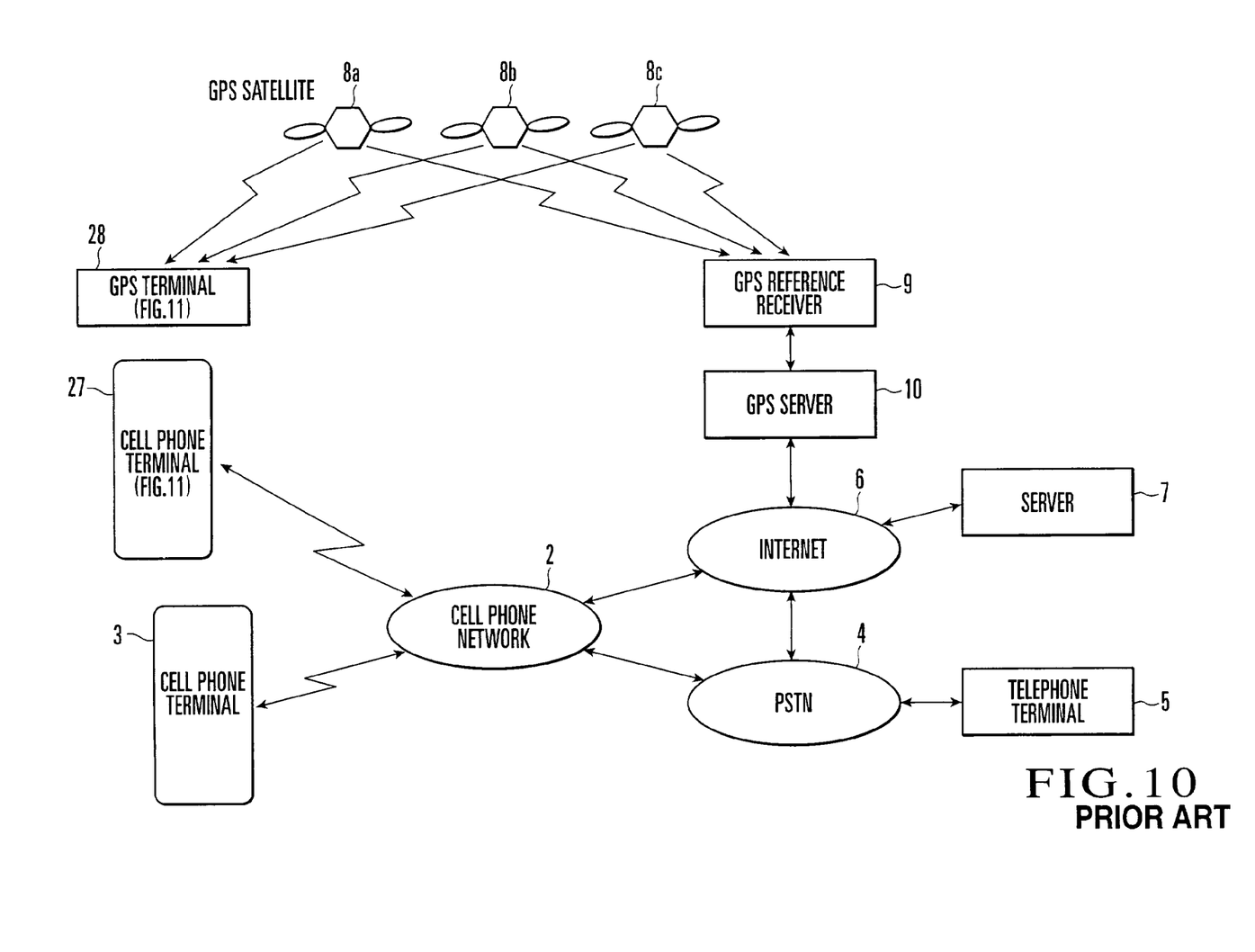
FIG. 10 is a block diagram showing the arrangement of a conventional cell phone system.

FIG. 10 shows an example of coupling a cell phone system to a cell phone position measurement system using server-assist or server-driven GPS. In FIG. 10, the cell phone system comprises a plurality of cell phone terminals 3 and 27, and a cell phone network 2 connected to the cell phone terminals 3 and 27. The cell phone terminal 27 communicates voice and data with the cell phone terminal 3, and with a telephone set 5 and server 7 via a PSTN (Public Switched Telephone Network) 4 and Internet 6 connected to the cell phone network 2.

The GPS position measurement system is constituted by a plurality of GPS satellites 8a, 8b, and 8c which orbit around the Earth, a GPS reference receiver 9 which receives signals from the GPS satellites 8a, 8b, and 8c, a GPS terminal 28, and a GPS server 10 connected to the GPS reference receiver 9. The GPS reference receiver 9 is connected to the Internet 6. The GPS terminal 28 communicates with the cell phone terminal 27 by radio.

In the system obtained by coupling the cell phone system and position measurement system, the functions of these systems independently operate. By using position information such as a latitude and longitude measured by the position measurement system, the cell phone system utilizes the server 7 to provide services.

Figure 11:
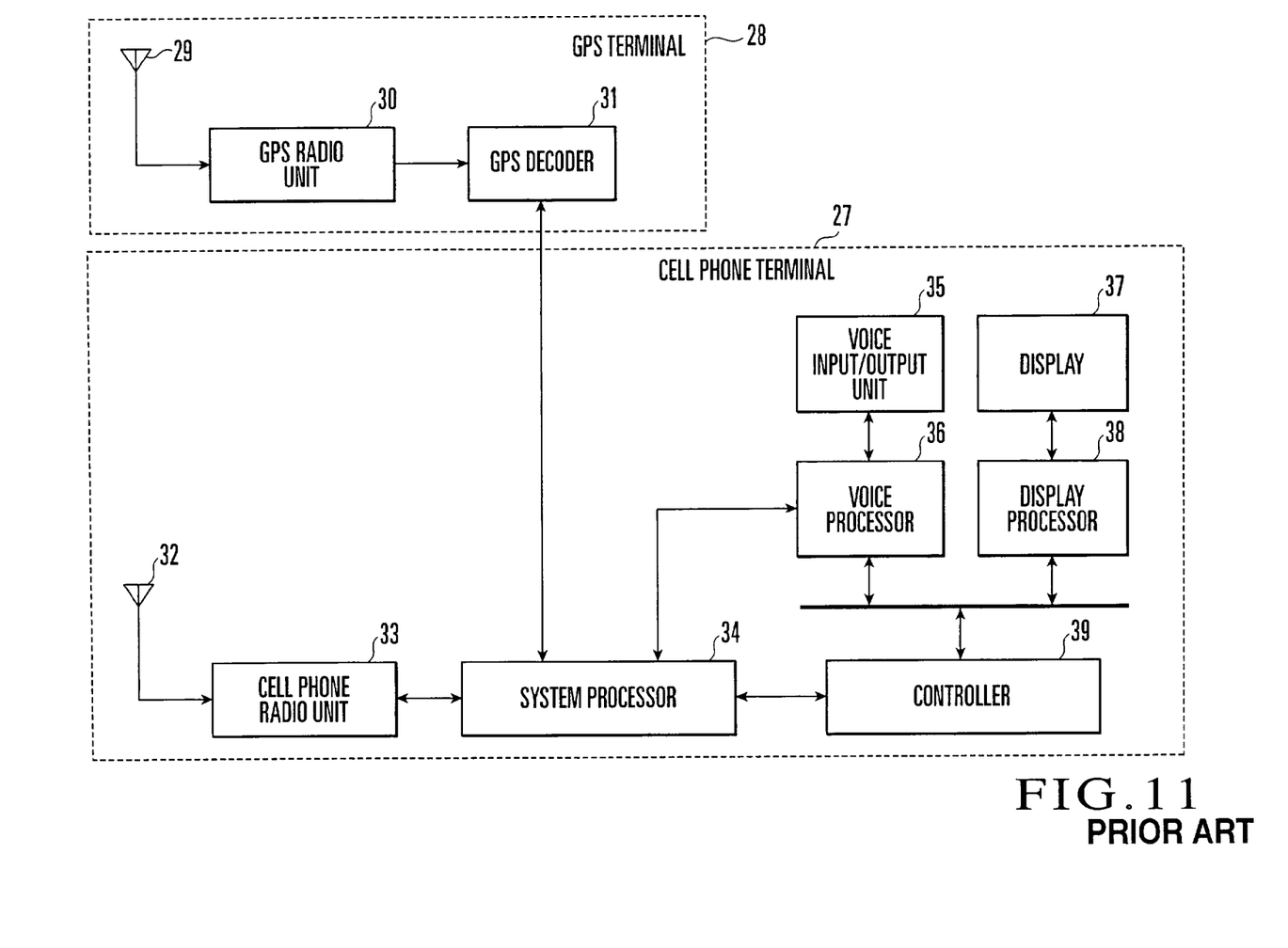
FIG. 11 is a block diagram showing the arrangements of a conventional cell phone terminal and GPS terminal.

As shown in FIG. 11, the GPS terminal 28 comprises a GPS antenna 29 which receives a GPS signal, a GPS radio unit 30 which demodulates the received GPS signal, and a GPS decoder 31 which decodes the demodulated GPS signal. The cell phone terminal 27 has a transmission/reception antenna 32 which transmits/receives a radio signal to/from the cell phone system, a cell phone radio unit 33 which modulates/demodulates a transmitted/received radio signal, a system processor 34 which is connected to the cell phone radio unit 33 and processes a cell phone signal and GPS signal, a voice input/output unit 35, a voice processor 36, a display 37, a display processor 38, and a controller 39 which performs the overall processing.

Figure 12:
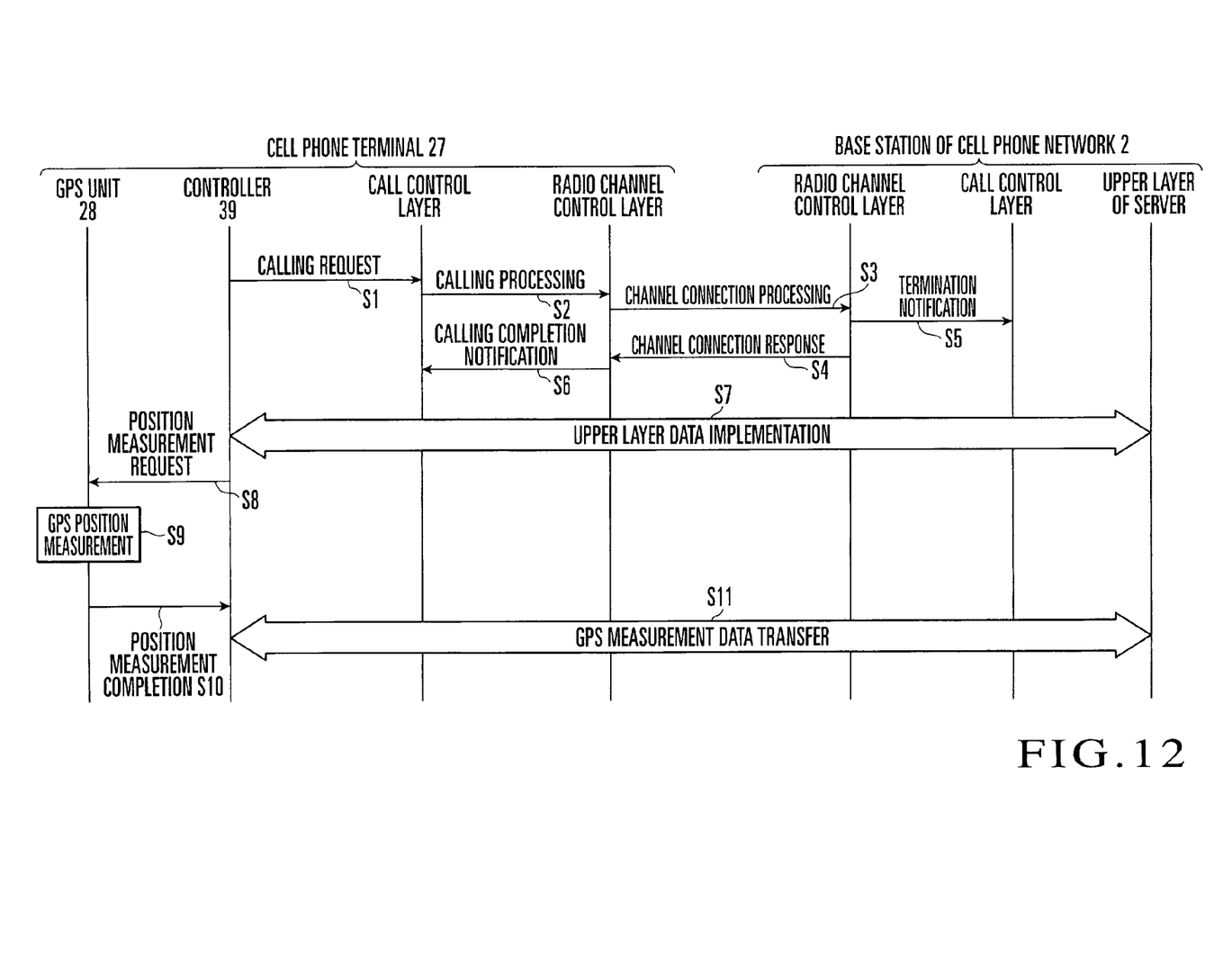
FIG. 12 is a sequence chart showing the operation of the conventional cell phone system.

FIG. 12 shows server-assist or server-driven GPS position measurement operation by the cell phone terminal 27 and GPS terminal 28. Steps S1 to S6 show sequence operations for performing channel connection between the GPS terminal 28, the cell phone terminal 27, and the cell phone network 2. In the cell phone terminal 27, the controller 39 issues a calling request to the call control layer of the system processor 34 (step S1). Upon reception of this calling request, the call control layer performs calling processing with respect to a radio channel control layer (step S2).

The radio channel control layer executes channel connection processing with respect to the radio channel control layer of the base station of the cell phone network 2 (step S3). The radio channel control layer sends a termination notification to the call control layer of the base station (step S5), and sends a channel connection response to the radio channel control layer of the cell phone terminal 27 (step S4). The call control layer of the cell phone terminal 27 receives a calling completion notification from the radio channel control layer (step S6). As a result, upper layer data is implemented from the controller 39 of the cell phone terminal 27 to the GPS server 10 (step S7).

To perform GPS position measurement in the channel-connected state, the controller 39 issues a GPS position measurement request to the GPS decoder 31 of the GPS terminal 28 via the system processor 34 (step S8). Upon reception of this request, a GPS block made up of the GPS antenna 29, GPS radio unit 30, and GPS decoder 31 receives signals from the GPS satellites 8a, 8b, and 8c and decodes them to perform GPS position measurement (step S9). After the end of GPS position measurement, the GPS decoder 31 notifies the controller 39 via the system processor 34 of the completion of position measurement (step S10). Then, the controller 39 executes, with respect to the GPS server 10, communication (transfer) associated with position information including transmission of a signal obtained by GPS position measurement (step S11).

In the conventional system, the radio unit 33 of the cell phone terminal 27 and the GPS radio unit 30 of the GPS terminal 28 operate independently. When the terminals 27 and 28 are located close to each other or the radio units 30 and 33 are housed in the same terminal, mutual interference occurs between the radio units 30 and 33. The GPS method exhibits a received radio field intensity much lower than the transmission power of a general radio system, and readily decreases the reception sensitivity by transmission radio waves. To prevent this, it is desirable to time-exclusively perform the operation of the GPS receiver and transmission signal processing operation.

However, a non-TDMA (Time Division Multiple Access) system such as an IMT-2000 (International Mobile Telecommunications 2000) system executes continuous transmission and does not have any transmission signal idle time. The GPS receiver cannot receive any signal in the transmission mode.

If the radio unit 33 of the cell phone terminal 27 stops transmission operation in order to avoid mutual interference between the radio units 30 and 32, the function layer which controls the call control function of the cell phone system undesirably performs channel recovery processing.

SUMMARY OF THE INVENTION

It is an object of the present invention to provide a cell phone position measurement system and control method capable of performing position measurement operation while sustaining the channel of a cell phone terminal.

To achieve the above object, according to the present invention, there is provided a cell phone position measurement system comprising position measurement means for performing position measurement using a satellite, and a cell phone terminal which notifies the position measurement means of a signal received from the satellite and receives a position information service, wherein the cell phone terminal comprises a receiving unit which receives the signal from the GPS satellite, a radio phone unit which notifies the position measurement means via a radio channel and a cell phone network of position measurement data obtained from the GPS signal received by the receiving unit, and a controller which controls the radio phone unit and temporarily interrupts communication via the radio channel in position measurement through the receiving unit.

DESCRIPTION OF THE PREFERRED EMBODIMENTS

The present invention will be described in detail below with reference to the accompanying drawings.

Figure 1:
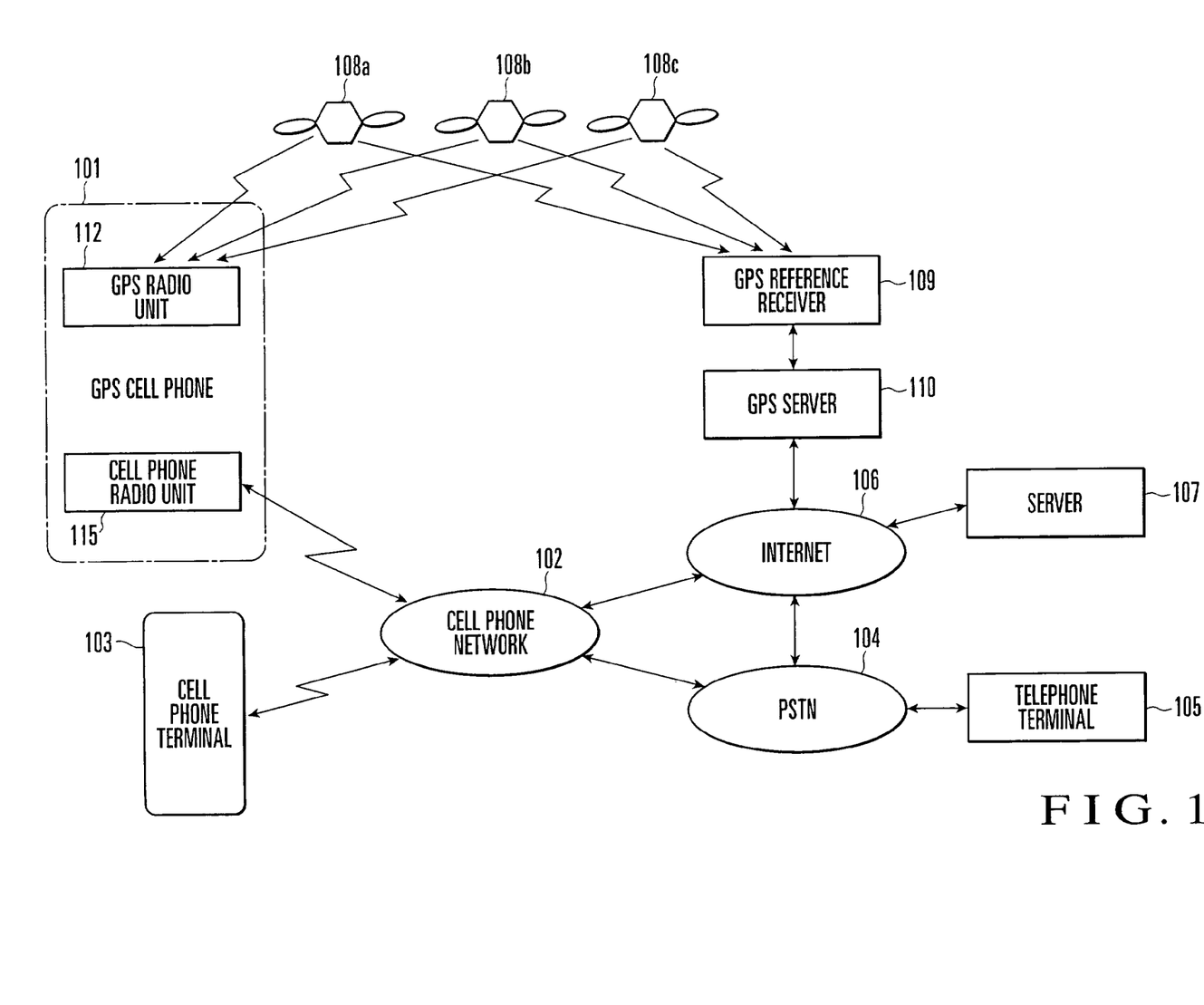
FIG. 1 is a block diagram showing the arrangement of a position measurement system according to the first embodiment of the present invention.

FIG. 1 shows a position measurement system according to the first embodiment of the present invention. In the cell phone system shown in FIG. 1, a cell phone terminal (to be referred to as a GPS cell phone hereinafter) 101 having a GPS function comprises a GPS radio unit 112 and cell phone radio unit 115. The cell phone radio unit 115 of the GPS cell phone 101 is connected to a cell phone network 102. The GPS cell phone 101 performs voice communication and data communication with a general cell phone terminal 103 via the cell phone network 102.

The cell phone network 102 is connected to a PSTN (Public Switched Telephone Network) 104 and Internet 106. The GPS cell phone 101 performs voice communication and data communication with a telephone terminal 105 via the cell phone network 102 and PSTN 104. In addition, the GPS cell phone 101 performs data communication with a server 107 via the cell phone network 102 and Internet 106.

The position measurement system of the first embodiment comprises a plurality of GPS satellites 108a, 108b, and 108c which orbit around the Earth, a GPS reference receiver 109 which always receives GPS signals from the GPS satellites 108a, 108b, and 108c, and a GPS server 110 which measures and calculates a reception position from position measurement data received at an arbitrary location on the basis of data obtained from a GPS signal received by the GPS reference receiver 109. The GPS cell phone 101 is connected to the GPS server 110 via the cell phone network 102 and Internet 106.

The GPS radio unit 112 of the GPS cell phone 101 intermittently receives signals from the GPS satellites 108a, 108b, and 108c. The GPS cell phone 101 issues a position measurement request to the GPS server 110 via the cell phone network 102 and Internet 106 on the basis of position measurement data obtained from a signal received by the GPS radio unit 112.

Figure 2:
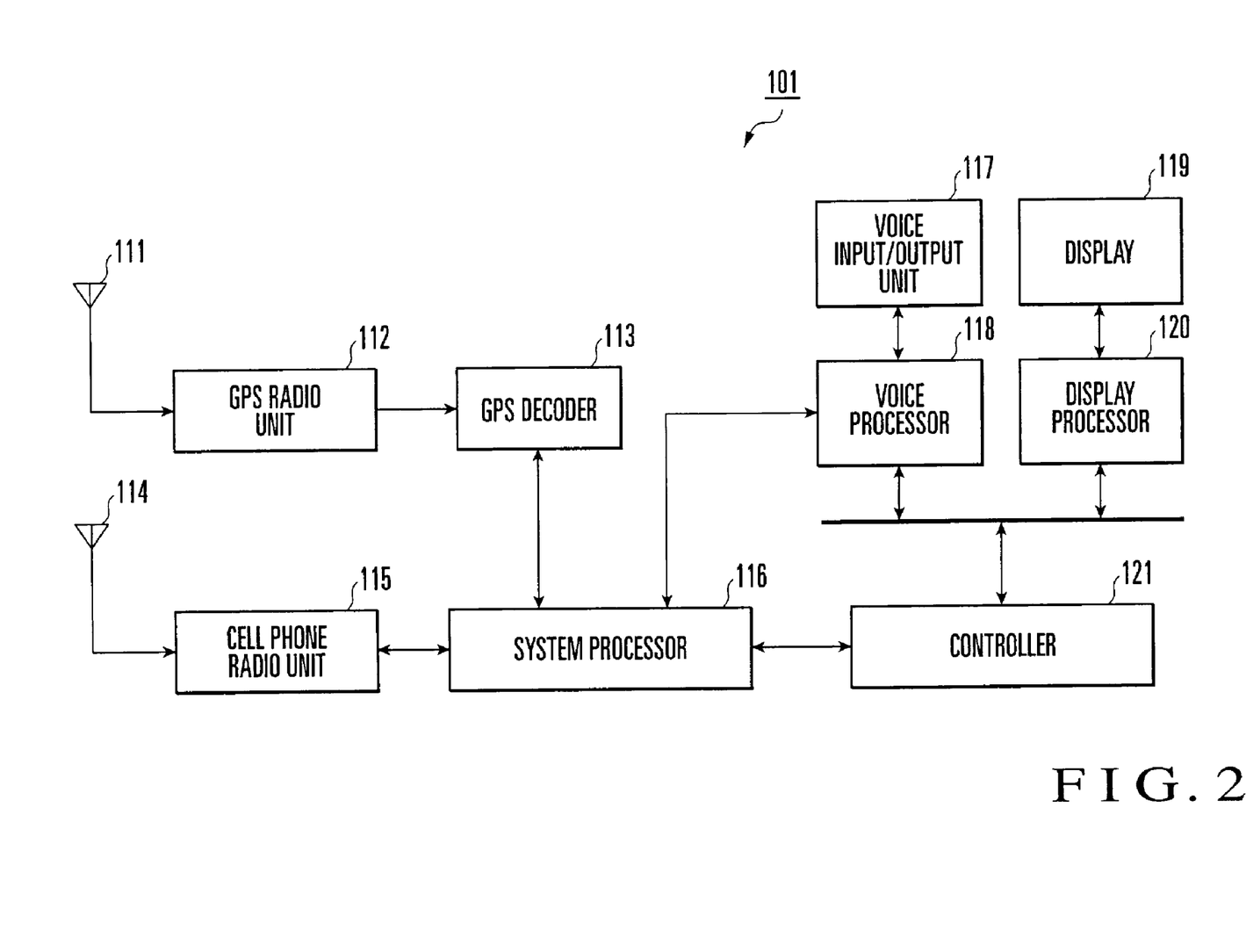
FIG. 2 is a block diagram showing the arrangement of a GPS cell phone shown in FIG. 1.

As shown in FIG. 2, the GPS cell phone 101 comprises a GPS antenna 111 which receives GPS signals from the GPS satellites 108a, 108b, and 108c, the GPS radio unit 112 which demodulates the received GPS signal, a GPS decoder 113 which decodes the demodulated GPS signal, a transmission/reception antenna 114 which transmits/receives a radio signal to/from the cell phone system, a cell phone radio unit 115 which modulates/demodulates a transmitted/received radio signal, a system processor 116 which performs respective processes for a cell phone signal from the cell phone radio unit 115 and a GPS signal from the GPS decoder 113, a voice input/output unit 117, a voice processor 118, a display 119, a display processor 120, and a controller 121 which controls the overall terminal.

The voice input/output unit 117 is connected to the voice processor 118, whereas the display 119 is connected to the display processor 120. The voice processor 118 is connected to the system processor 116, and the voice processor 118 and display processor 120 are connected to the controller 121 via a bus. The GPS radio unit 112 and GPS decoder 113 are formed by well-known techniques, and a detailed description thereof will be omitted.

The operation of the position measurement system will be explained with reference to FIG. 3.

Figure 3:
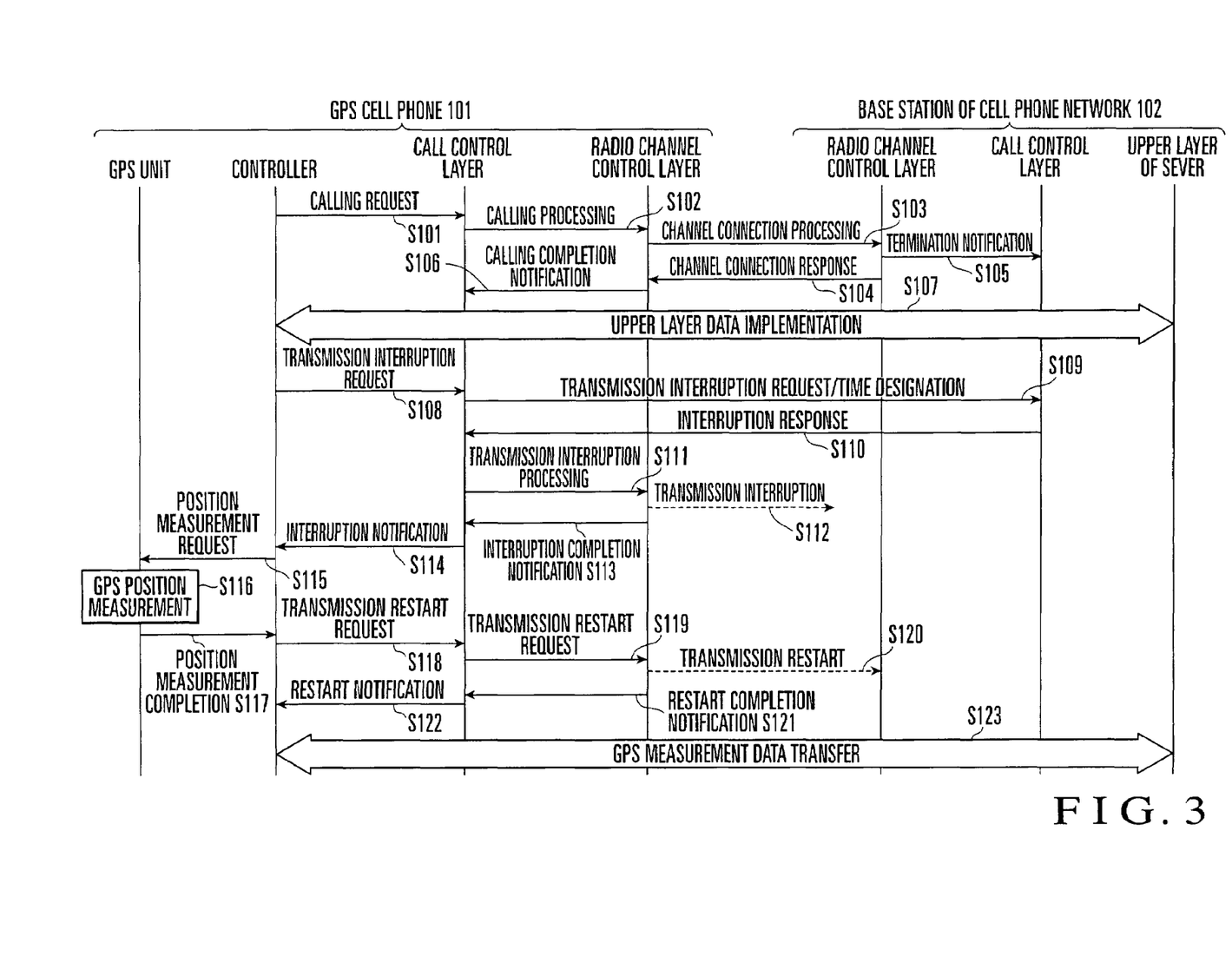
FIG. 3 is a sequence chart showing the operation of the position measurement, system in FIG. 1.

In FIG. 3, steps S101 to S106 show sequence operations for performing channel connection between the GPS cell phone 101 and the cell phone network 102. The controller 121 issues a calling request to the call control layer of the system processor 116 (step S101). In response to this request, the call control layer performs calling processing with respect to the radio channel control layer of the cell phone radio unit 115 (step S102).

The radio channel control layer executes channel connection processing with respect to the radio channel control layer of the base station of the cell phone network 102 (step S103). After channel connection, the radio channel control layer of the base station sends a termination notification to the call control layer of the base station (step S105), and sends a channel connection response to the radio channel control layer of the GPS cell phone 101 (step S104). The call control layer of the GPS cell phone 101 receives a calling completion notification from the radio channel control layer (step S106). Then, channel connection is established, and upper layer data is implemented (step S107).

To perform GPS position measurement in this state, steps S108 to S114 are executed. At this time, communication (transmission) through the radio channel during channel connection is temporarily interrupted. First, the controller 121 issues a transmission interruption request to the call control layer of the system processor 116 (step S108). In response to this request, the call control layer issues a transmission interruption request with interruption time designation (transmits a call control message) to the call control layer of the base station of the cell phone network 2 (step S109).

Upon reception of an interruption response from the call control layer of the base station (step S110), the call control layer of the GPS cell phone 101 issues a transmission interruption request to the radio channel control layer (step S111). Then, the radio channel control layer interrupts transmission (stops transmitting radio waves) (step S112), and sends back an interruption completion notification to the call control layer (step S113). The call control layer of the GPS cell phone 101 sends an interruption notification to the controller 121 (step S114), thereby completing preparations for GPS position measurement.

The controller 121 issues a GPS position measurement request to the system processor 116 (step S115). The GPS antenna 111, GPS radio unit 112, and GPS decoder 113 which constitute a GPS unit (block) receive and decode signals from the GPS satellites 108*a*, 108*b*, and 108*c* (step S116). After the end of GPS position measurement, the system processor 116 sends a position measurement completion notification to the controller 121 (step S117).

Subsequently, transmission restart processing in steps S118 to S122 is executed, and a transmission channel for communicating with the GPS server is restored. That is, the controller 121 issues a transmission restart request to the call control layer of the system processor 116 (step S118). In response to this request, the call control layer issues a transmission restart request to the radio channel control layer (step S119).

The radio channel control layer restarts transmission (step S120), and sends back a restart completion notification to the call control layer (step S121). Upon reception of this, the call control layer sends a completion notification to the controller 121 (step S122), completing preparations for a transmission channel for communicating with the GPS server 110. After the completion of transmission channel preparations, the controller 121 performs communication associated with position information including transmission of GPS position measurement data obtained by GPS position measurement in step S116 to the GPS server 110 (step S123).

According to the first embodiment, cell phone radio waves transmitted/received from/by the GPS cell phone 101 are temporarily interrupted during GPS position measurement so as not to determine a channel error by the base station. The first embodiment can therefore increase the GPS position measurement performance while sustaining the channel.

Figure 4:
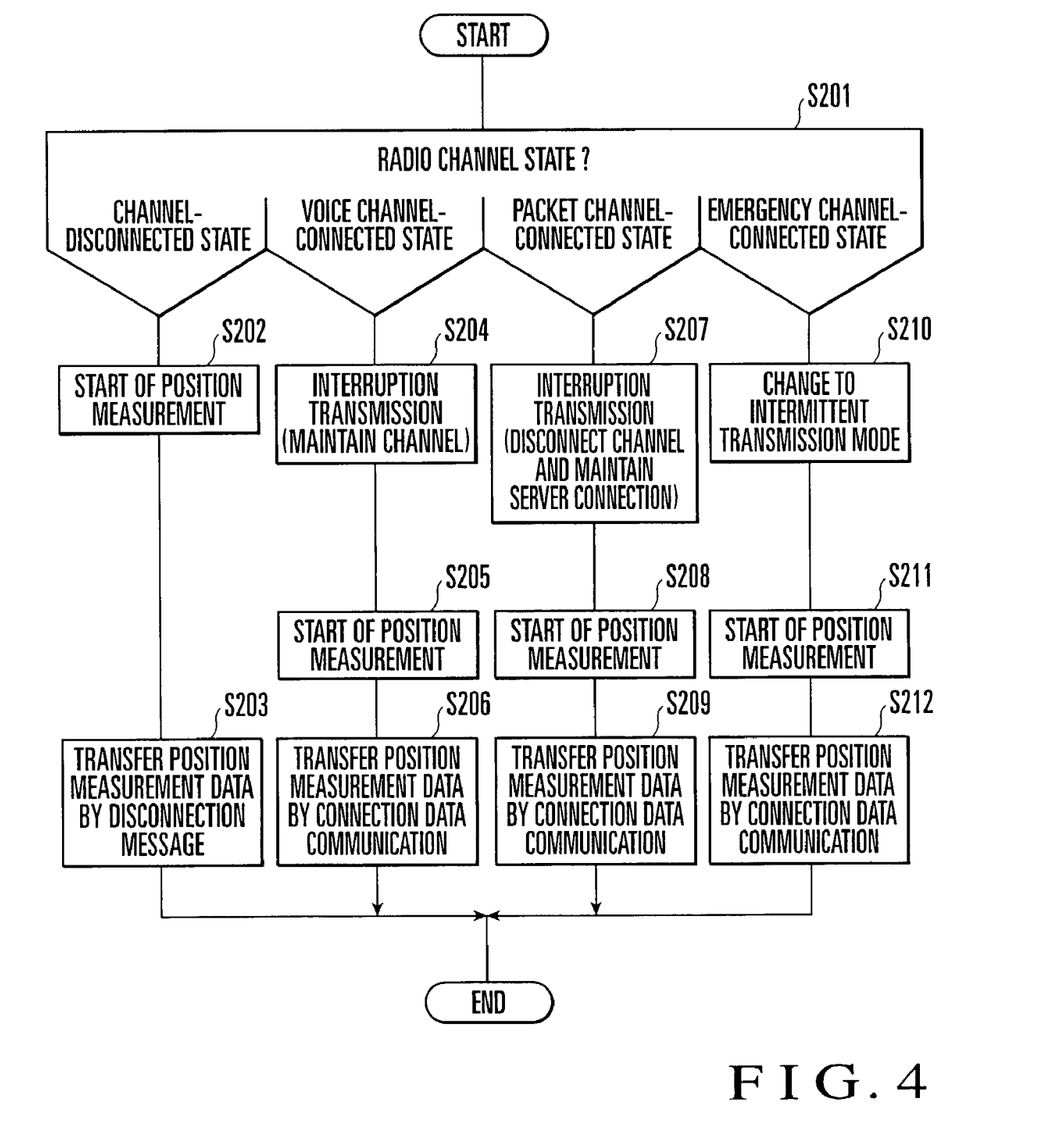
FIG. 4 is a flow chart showing the operation of a position measurement system according to the second embodiment of the present invention.

The operation of a position measurement system according to the second embodiment of the present invention will be described with reference to FIG. 4. The arrangement of the second embodiment is the same as that of the first embodiment, and a description thereof will be omitted by applying FIGS. 1 and 2 to the second embodiment.

In the first embodiment, the radio channel of the GPS cell phone 101 is connected. In the second embodiment, a radio channel state is monitored by the call control layer of a GPS cell phone 101 in accordance with a transmission interruption request from a controller 121, and a radio communication control method in transferring GPS position measurement data is selected (changed) in accordance with the radio channel state.

The call control layer of the GPS cell phone 101 monitors the radio channel state of the GPS cell phone 101 in accordance with a transmission interruption request (step S108 in FIG. 3) (step S201). If the channel is not connected in step S201 (channel-disconnected state), transmission interruption processing shown in steps S109 to S113 of FIG. 3 and transmission restart processing shown in steps S119 to S121 need not be performed, and GPS position measurement is immediately executed (step S202; steps S114 to S117 in FIG. 3). After that, position measurement data is transferred using channel disconnection message communication (step S203; step S123 in FIG. 3).

If the channel is connected for voice in step S201 (voice channel-connected state), transmission is temporarily interrupted in the channel sustention mode of the call control layer (step S204; steps S109 to S113 in FIG. 3). After GPS position measurement (step S205; steps S114 to S117 in FIG. 3), transmission restarts, and position measurement data is transferred using channel connection data communication (step S206; step S123 in FIG. 3).

If the channel is connected for a packet in step S201 (packet channel-connected state), transmission is interrupted in the operation mode of the call control layer in which channel disconnection and server connection sustention are performed (step S207; steps S109 to S113 in FIG. 3). After GPS position measurement (step S208; steps S114 to S117 in FIG. 3), position measurement data is transferred using channel connection message communication (step S209; step S123).

If the channel is connected for emergency communication in step S201 (emergency channel-connected state), communication shifts to an operation mode in which transmission is intermittently executed instead of complete interruption (step S210; steps S109 to S113 in FIG. 3). After GPS position measurement is completed (step S211; steps S114 to S117 in FIG. 3), position measurement data is transferred using channel connection data communication (step S212; step S123 in FIG. 3).

According to the second embodiment, the radio communication control method in GPS position measurement is selected (changed) in accordance with the radio channel state, thus minimizing the influence of the channel use on an application. Position measurement operation can be assured while the operation of the cell phone terminal is changed in accordance with the use state of the GPS cell phone 101 and the cell phone terminal keeps operating.

Figure 5:
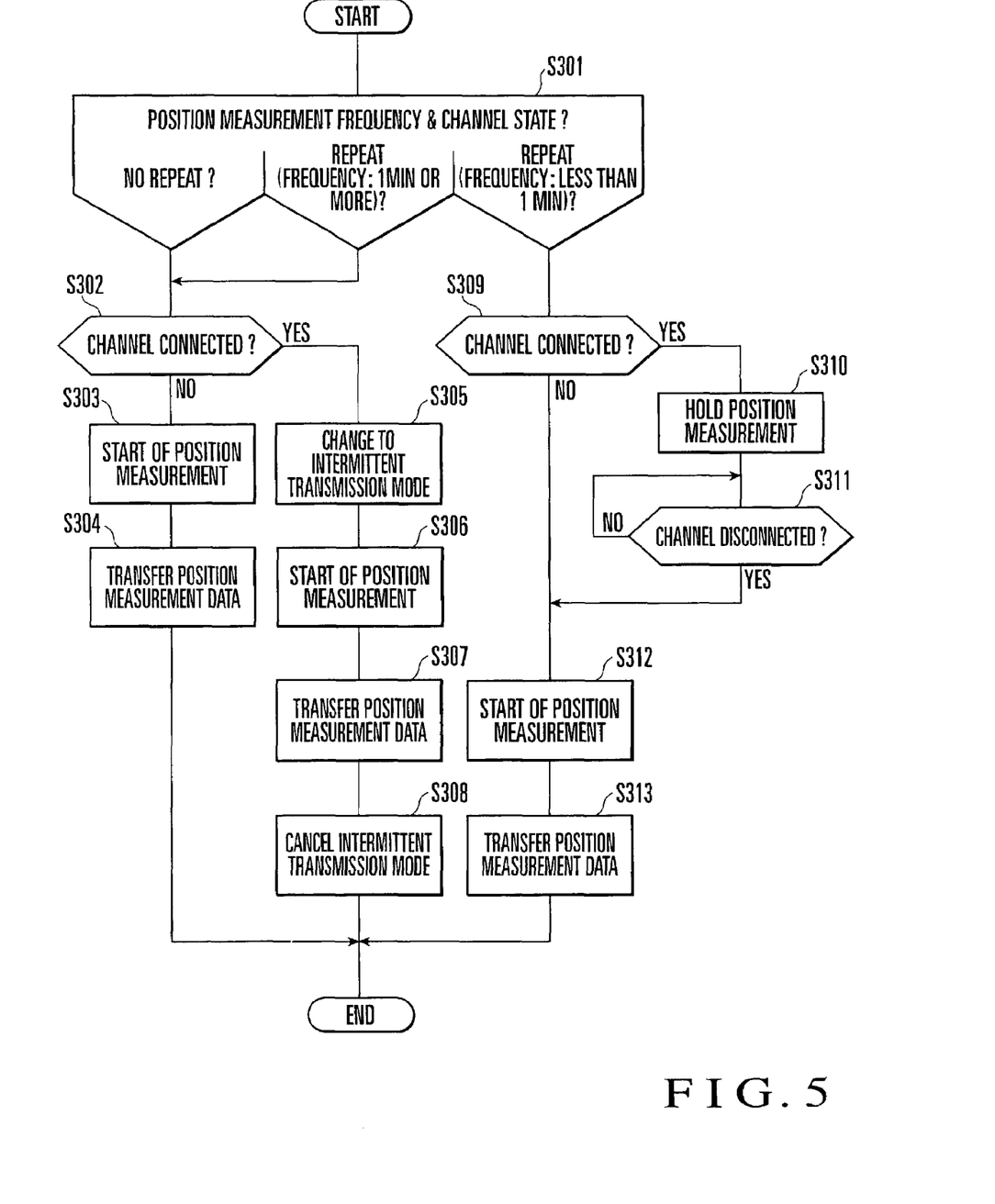
FIG. 5 is a flow chart showing the operation of a position measurement system according to the third embodiment of the present invention.

The operation of a position measurement system according to the third embodiment of the present invention will be described with reference to FIG. 5. The arrangement of the third embodiment is the same as that of the first embodiment, and a description thereof will be omitted by applying FIGS. 1 and 2 to the third embodiment.

In the second embodiment, the radio communication control method in GPS position measurement is selected (changed) in accordance with the radio channel state of the GPS cell phone 101. In the third embodiment, the GPS position measurement frequency and radio channel state in the call control layer of a GPS cell phone 101 are monitored in accordance with a transmission interruption request from a controller 121 of the GPS cell phone 101, and the radio communication control method in GPS position measurement is selected (changed) in accordance with the monitoring result.

The call control layer of the GPS cell phone 101 checks the GPS position measurement frequency and monitors the radio channel state in accordance with a transmission interruption request (step S108 in FIG. 3) (step S301). If the position measurement frequency setting is "no repeat" or a frequency of 1 min or more in step S301 and the channel is not connected (NO in step S302), GPS position measurement is immediately executed (step S303; steps S114 to S117 in FIG. 3). After GPS position measurement, position measurement data is transferred using channel disconnection message communication (step S304; step S123 in FIG. 3).

If the channel is connected in step S302, the operation mode of the call control layer is changed to an intermittent transmission mode (step S305), and GPS position measurement is performed (step S306; steps S114 to S117 in FIG. 3). Position measurement data is transferred using channel disconnection message communication (step S307; step S123 in FIG. 3), and then the intermittent transmission mode is canceled (step S308; steps S119 to S121 in FIG. 3).

If the repetitive setting is less than 1 min in step S301 and the channel is connected (YES in step S309), GPS position measurement is suspended (step S310). The flow waits for disconnection of the channel (YES in step S311), and then GPS position measurement is performed (step S312; steps S114 to S117 in FIG. 3). After GPS position measurement, position measurement data is transferred using channel disconnection message communication (step S313; step S123 in FIG. 3). If NO in step S309, the flow directly shifts to steps S312 and S313.

According to the third embodiment, the radio communication control method in GPS position measurement is changed in accordance with the GPS position measurement frequency and radio channel state, thereby minimizing the influence of the channel use on an application. The operation of the position measurement system can be assured while the operation of the cell phone terminal is changed in accordance with the use scene of the cell phone terminal and the cell phone terminal keeps operating.

Figure 6:
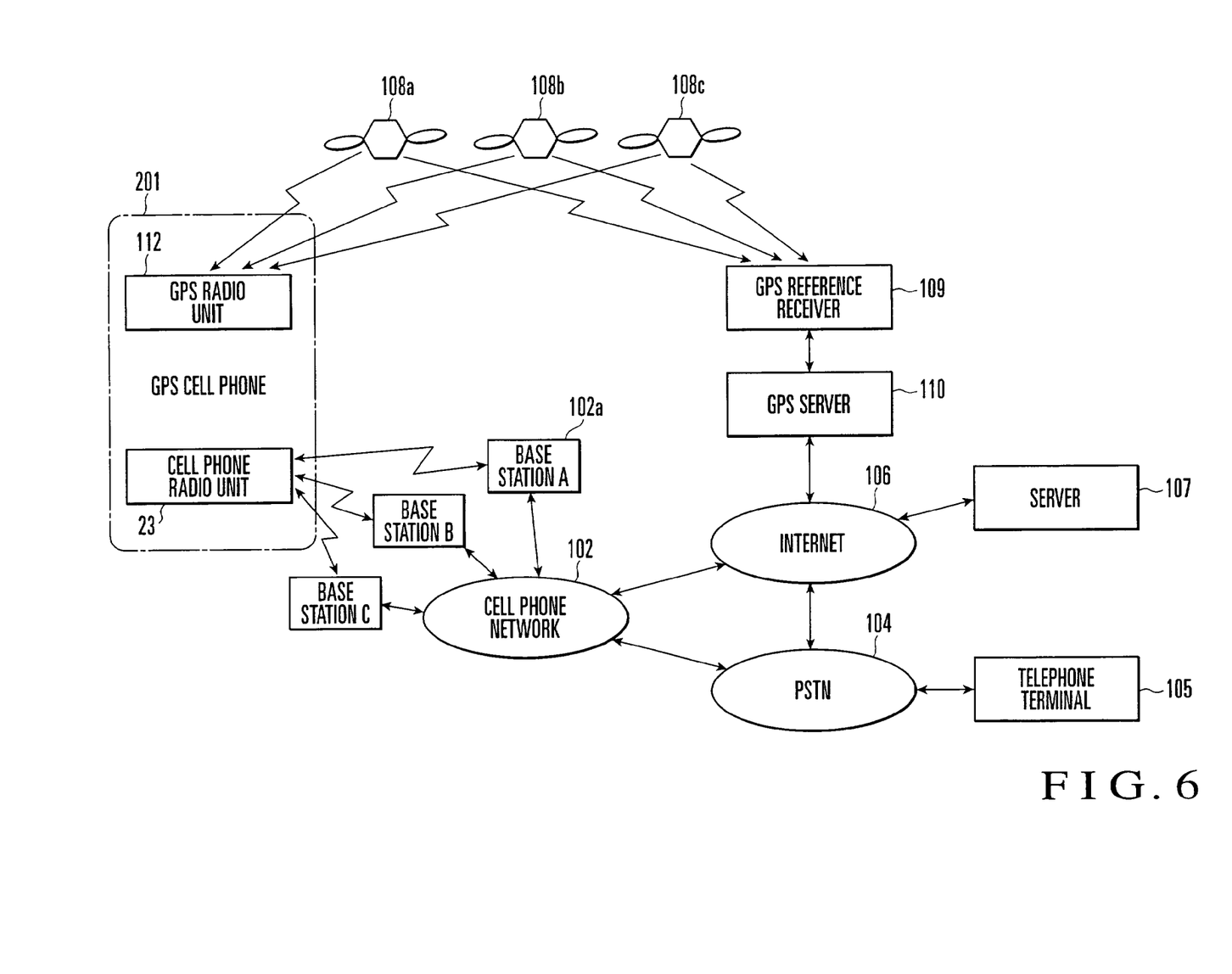
FIG. 6 is a block diagram showing the arrangement of a position measurement system according to the fourth embodiment of the present invention.
Figure 7:
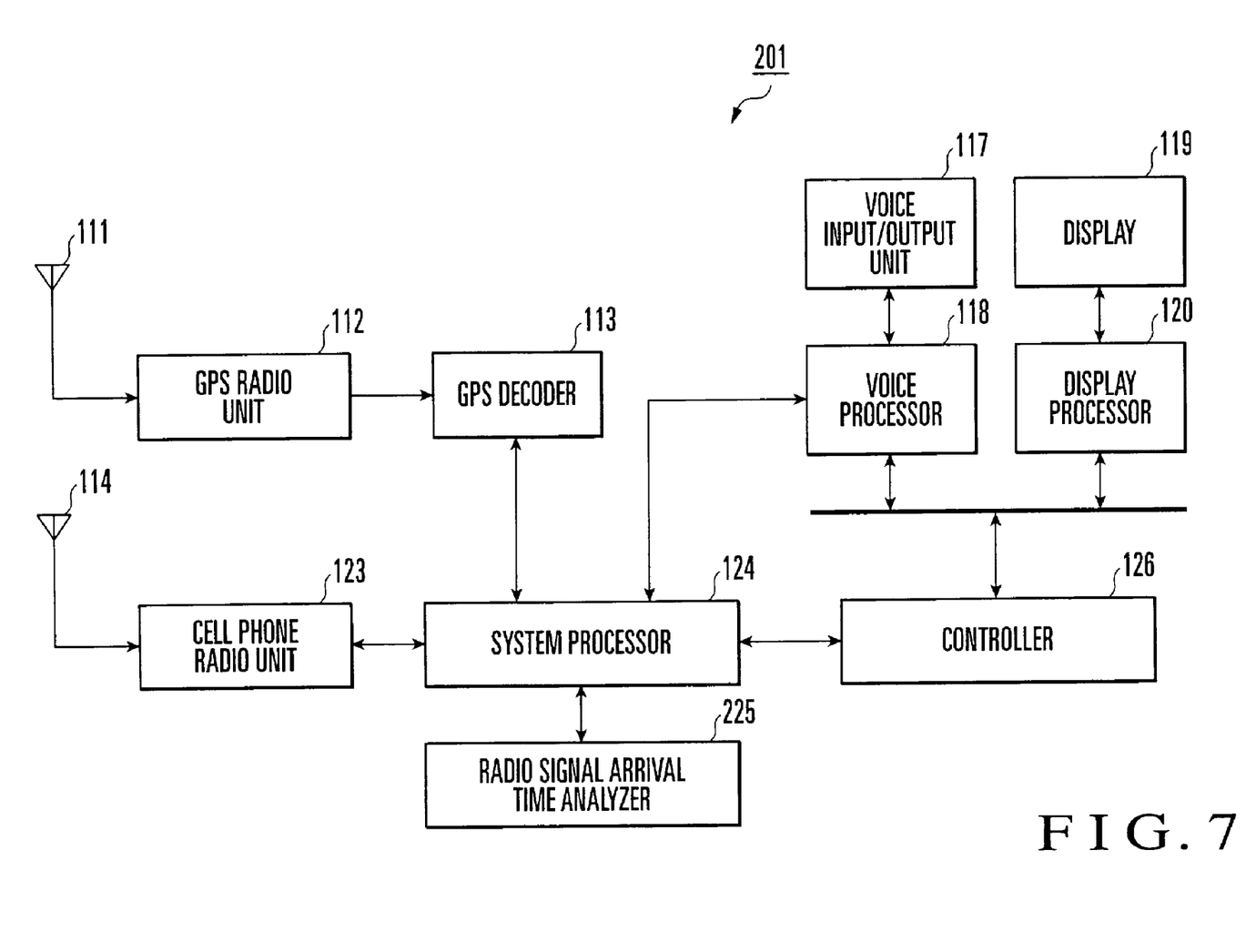
FIG. 7 is a block diagram showing the arrangement of a GPS cell phone shown in FIG. 6.

A position measurement system according to the fourth embodiment of the present invention will be described with reference to FIGS. 6 and 7. In the fourth embodiment, compared to the first embodiment, a radio signal arrival time analyzer 225 is added to a GPS cell phone 201, as shown in FIG. 7, and position measurement is performed on the basis of a signal arrival time obtained by lower layer data transmission with respect to each base station 102a (FIG. 6) of a cell phone network 102.

In addition to the radio signal arrival time analyzer 225, the GPS cell phone 201 comprises a cell phone radio unit 123, a system processor 124 which performs cell phone signal processing and analyzes a GPS signal and the radio arrival time processing result of the cell phone system, and a controller 126 which executes the overall processing. The remaining arrangement is the same as that in FIG. 2.

Figure 8:
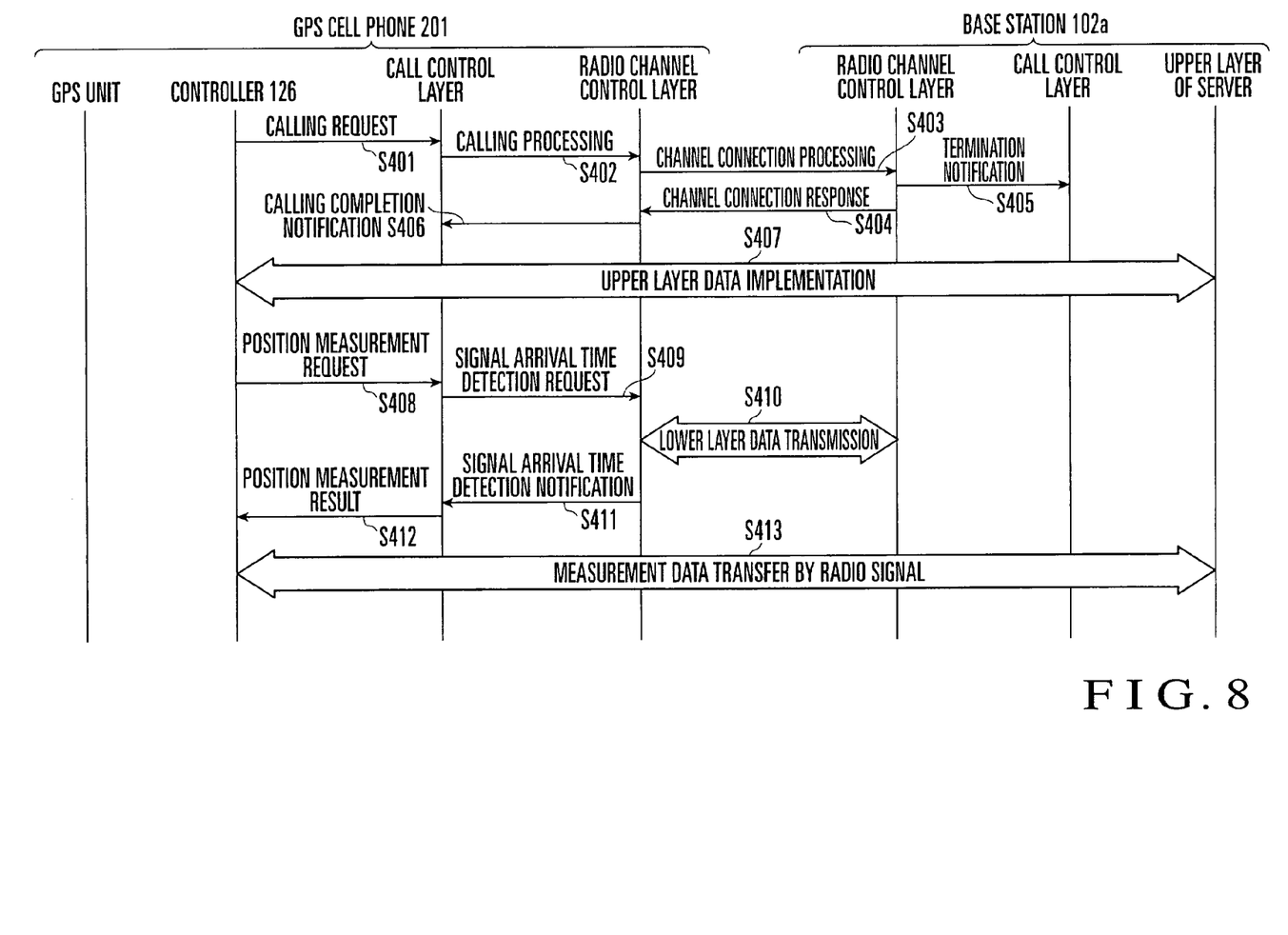
FIG. 8 is a sequence chart showing the operation of the position measurement system in FIG. 6.

The operation of the position measurement system will be explained with reference to FIG. 8. The controller 126 issues a calling request to the call control layer of the system processor 124 (step S401). In response to this request, the call control layer performs calling processing with respect to the radio channel control layer of the cell phone radio unit 123 (step S402).

The radio channel control layer executes channel connection processing with respect to the radio channel control layer of the base station 102a of the cell phone network 102 (step S403). The radio channel control layer of the base station 102a sends a termination notification to the call control layer of the base station 102a (step S405), and sends a channel connection response to the radio channel control layer of the GPS cell phone 201 (step S404). The call control layer of the GPS cell phone 201 receives a calling completion notification from the radio channel control layer (step S406). Then, channel connection is established, and upper layer data is implemented from the controller 126 of the GPS cell phone 201 to a GPS server 110 (step S407).

To perform position measurement while the upper layer is implemented, the controller 126 issues a position measurement request to the call control layer of the system processor 124 (step S408). Upon reception of this, the call control layer of the system processor 124 issues a signal arrival time detection request to the radio channel control layer (step S409). Lower layer data is transmitted between the radio channel control layer of the system processor 124 and the radio control layer of the base station 102a (step S410). The radio channel control layer of the system processor 124 detects the arrival time by the radio signal arrival time analyzer 225, and notifies the call control layer of the system processor 124 of the detection result (step S411). The controller 126 receives the detection result from the system processor 124 (step S412), and transfers position measurement data obtained from the detection result to the GPS server 110 (step S413).

Figure 9:
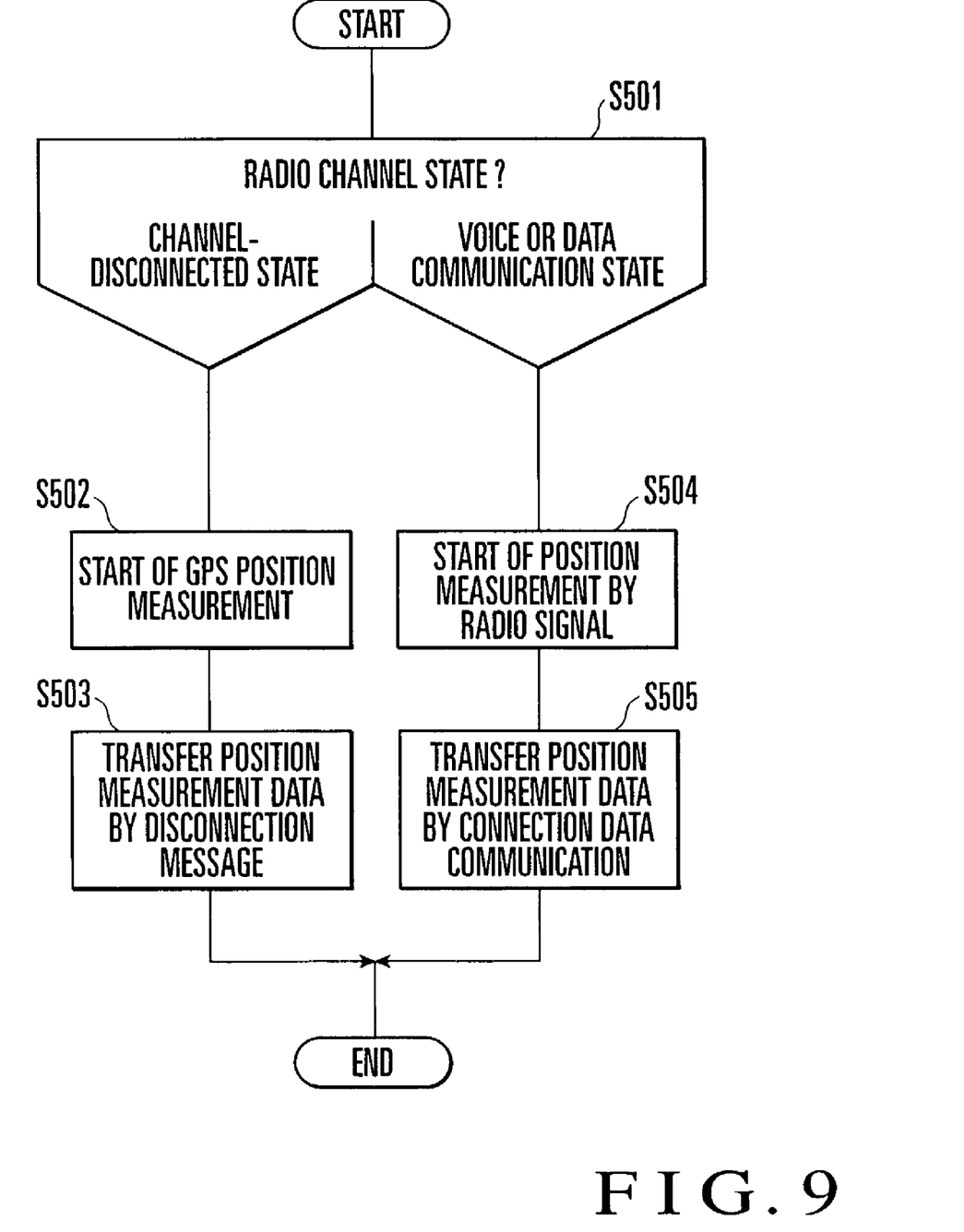
FIG. 9 is a flow chart showing the operation of a position measurement system according to the fifth embodiment of the present invention.

The operation of a position measurement system according to the fifth embodiment of the present invention will be described with reference to FIG. 9. The arrangement of the fifth embodiment is the same as that of the third embodiment, and a description thereof will be omitted by applying FIGS. 6 and 7 to the fifth embodiment.

In response to a position measurement request from a controller 126 of a GPS cell phone 101 (step S408 in FIG. 8), the call control layer of a system processor 124 monitors the radio channel state of the GPS cell phone 101 (step S501).

If the radio channel is not connected in step S501, GPS position measurement starts similarly to FIG. 3 (step S502). Position measurement data is transferred using channel disconnection message transmission (step S503). If the channel is connected for voice or data communication in step S501, position measurement is executed using the radio signal arrival time of the cell phone system (step S504). Obtained position measurement data is transferred to the position measurement system by channel connection data communication (step S505).

According to the fifth embodiment, GPS position measurement is performed in the channel-disconnected state. In the channel-connected state, position measurement is performed based on the signal arrival time obtained by lower layer data transmission with respect to each base station 102a of a cell phone network 102, in place of GPS position measurement which may be influenced by radio communication. High-quality position measurement can be realized regardless of the channel-connected state.

As has been described above, according to the present invention, GPS position measurement is performed by a cell phone terminal while radio communication is temporarily interrupted. The position of the cell phone terminal can be reliably measured, and a channel determination error by the base station can be prevented.

What is claimed is:

1. A cell phone position measurement system characterized by comprising:

position measurement means for performing position measurement using a satellite; and a cell phone terminal which notifies said position measurement means of a signal received from the satellite and receives a position information service, wherein said cell phone terminal comprises a receiving unit which receives the signal from the satellite, a radio phone unit which notifies said position measurement means via a radio channel and a cell phone network of position measurement data obtained from the signal received by said receiving unit, and a controller which controls said radio phone unit and temporarily interrupts communication via the radio channel in position measurement through said receiving unit, wherein said position measurement system further comprises an analyzer which performs lower layer data transmission between a plurality of base stations constituting the cell phone network, and analyzes radio signal arrival time, and said controller notifies said position measurement system by channel disconnection message communication of position measurement data obtained by said receiving unit when a radio channel communication state at the start of position measurement is a channel-disconnected state, and notifies said position measurement system by channel connection data communication of position measurement data obtained from an analysis result of said analyzer when the radio channel communication state is a voice/data communication state.

2. A cell phone terminal characterized by comprising:

a receiving unit which receives a signal for position measurement from a satellite;

a radio phone unit which notifies a position measurement system via a radio channel and a cell phone network of position measurement data obtained from the signal received by said receiving unit; and a controller which controls said radio phone unit and temporarily interrupts communication in position measurement through said receiving unit, wherein said cell phone terminal further comprises an analyzer which performs lower layer data transmission between a plurality of base stations constituting the cell phone network, and analyzes radio signal arrival time, and said controller notifies the position measurement system by channel disconnection message communication of position measurement data obtained by said receiving unit when a radio channel communication state at the start of position measurement is a channel-disconnected state, and notifies the position measurement system by channel connection data communication of position measurement data obtained from an analysis result of said analyzer when the radio channel communication state is a voice/data communication state.

3. A position measurement method characterized by comprising the steps of:

receiving a signal from a satellite by a cell phone terminal;

notifying a position measurement system via a radio channel and a cell phone network of position measurement data obtained from the received signal; and temporarily interrupting communication via the radio channel from the cell phone terminal upon reception of the receiving signal, wherein the position measurement method further comprises the step of performing lower layer data transmission between a plurality of base stations constituting the cell phone network, and analyzing radio signal arrival time, and the interruption step comprises the step of notifying the position measurement system by channel disconnection message communication of position measurement data when a radio channel communication state at the start of position measurement is a channel-disconnected state, and notifying the position measurement system by channel connection data communication of position measurement data obtained from an analysis result of the radio signal arrival time when the radio channel communication state is a voice/data communication state.

\* \* \* \* \*